(12) United States Patent
Jang et al.

(10) Patent No.: US 9,891,747 B2
(45) Date of Patent: Feb. 13, 2018

(54) MULTI-TOUCH SENSITIVE DISPLAY DEVICE AND METHOD FOR ASSIGNING TOUCH IDENTIFICATION THEREIN

(71) Applicant: LG Display Co., Ltd., Seoul (KR)

(72) Inventors: Hyunwoo Jang, Gyeonggi-do (KR); Juhong Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 93 days.

(21) Appl. No.: 14/983,742

(22) Filed: Dec. 30, 2015

(65) Prior Publication Data

US 2017/0090617 A1    Mar. 30, 2017

(30) Foreign Application Priority Data

Sep. 30, 2015    (KR) .................. 10-2015-0137746

(51) Int. Cl.
*G06F 3/045*    (2006.01)
*G06F 3/041*    (2006.01)

(52) U.S. Cl.
CPC .. *G06F 3/0416* (2013.01); *G06F 2203/04104* (2013.01); *G06F 2203/04808* (2013.01)

(58) Field of Classification Search
None
See application file for complete search history.

(56) References Cited

U.S. PATENT DOCUMENTS

| 2010/0253638 A1* | 10/2010 | Yousefpor | G06F 3/0412 345/173 |
| 2010/0271322 A1* | 10/2010 | Kondoh | G06F 3/0416 345/173 |
| 2012/0194452 A1* | 8/2012 | Cho | G06F 3/0416 345/173 |
| 2013/0076648 A1* | 3/2013 | Krah | G06F 3/0412 345/173 |

* cited by examiner

*Primary Examiner* — Jennifer Mehmood
*Assistant Examiner* — Stephen T Reed
(74) *Attorney, Agent, or Firm* — Morgan, Lewis & Bockius LLP

(57) ABSTRACT

A disclosed method for assigning a touch identification in a multi-touch sensitive display device is includes applying a touch driving signal to touch sensors of a touch screen and generating raw touch data, detecting touch points based on the raw touch data and respectively assigning temporary identifications (IDs) to the touch points, grouping the touch points based on a difference in distances between the touch points to form touch groups, and forming adaptive touch groups respectively based on the touch groups. The method also includes setting a comparison block including one or more of the adaptive touch groups contacting or overlapping each other, and matching the temporary ID assigned to one of the touch points within the comparison block in the current frame to one of a plurality of touch IDs within the comparison block in a previous frame.

11 Claims, 18 Drawing Sheets

| Group Number | Number of touch points | Comparison group | Number of comparison processes |
|---|---|---|---|
| 2 | 5 | 1, 3, 6, ⑦, ⑧ | 15 × 15 = 225 |
| 7 | 5 | 1, ②, 3, 6, ⑧, 11, ⑫, ⑬ | 24 × 24 = 576 |
| 8 | 5 | ②, 3, 4, ⑦, ⑨, ⑫, ⑬, ⑭ | 33 × 33 = 1089 |
| 9 | 5 | 3, 4, 5, ⑧, 10, ⑬, ⑭, 15 | 18 × 18 = 324 |
| 12 | 5 | 6, ⑦, ⑧, 11, ⑬, 16, 17, 18 | 19 × 19 = 361 |
| 13 | 4 | ⑦, ⑧, ⑨, ⑫, ⑭, 17, 18, 19 | 28 × 28 = 784 |
| 14 | 4 | ⑧, ⑨, 10, ⑬, 15, 18, 19, 20 | 18 × 18 = 324 |

Cost = $\theta$ + d

| AGP | Number of touch points | Comparison group | Number of comparison processes |
|---|---|---|---|
| 1 | 5 | – | 5 × 5 = 25 |
| 2 | 5 | 3, 5 | 15 × 15 = 225 |
| 3 | 5 | 2, 5 | 15 × 15 = 225 |
| 4 | 5 | – | 5 × 5 = 25 |
| 5 | 5 | 2, 3 | 15 × 15 = 225 |
| 6 | 4 | 7 | 8 × 8 = 64 |
| 7 | 4 | 6 | 8 × 8 = 64 |

MULTI-TOUCH SENSITIVE DISPLAY DEVICE AND METHOD FOR ASSIGNING TOUCH IDENTIFICATION THEREIN

This application claims the benefit of Korean Patent Application No. 10-2015-0137746 filed on Sep. 30, 2015, which is incorporated herein by reference for all purposes as if fully set forth herein.

BACKGROUND OF THE INVENTION

Field of the Invention

The present invention relates to a touch sensitive display device, and more particularly to, a multi-touch sensitive display device and a method for assigning a touch identification in the multi-touch sensitive display device.

Discussion of the Related Art

A user interface (UI) is configured so that users are able to communicate with various electronic devices and to easily and comfortably control the electronic devices as they desire. Examples of user interfaces include, but not limited to, a keypad, a keyboard, a mouse, an on-screen display (OSD), and a remote controller having an infrared communication function or a radio frequency (RF) communication function. User interface technology has continuously expanded to increase the user's sensibility and handling convenience. More recently developed user interfaces include a touch UI, a voice recognition UI, a 3D UI, and so on.

The touch UI has been widely adopted in portable information devices, such as smart phones, and its use has been expanded to notebook computers, computer monitors, and home appliances. A touch screen having capacitive touch sensors detects a touch input by sensing changes in capacitance (i.e., changes in the amount of charges in the touch sensors) when a user touches a touch sensor or sensors with his or her finger or another pointer.

Recently, as display devices become larger in size, an interest in a multi-touch sensitive display device capable of simultaneously recognizing a plurality of touch inputs is increasing. A multi-touch sensitive display device divides a plurality of touch inputs received from a plurality of users using identification (ID) tracking technology and then performs an operation of matching touch IDs of a current frame to touch IDs of a previous frame. Touch coordinates of the same user, which may repeatedly change during a plurality of frame periods, may be connected to the same touch ID through such a touch ID assignment operation.

A related art touch ID assignment technology compares touch points of an n-th frame (where n is a positive integer greater than 1) with touch points of an (n−1)-th frame, prioritizes the touch points, and connects each of the touch points of the n-th frame to a touch ID of the (n−1)-th frame having a relatively high priority. Because the related art touch ID assignment technology has to compare connectivity between all of the touch points of the touch screen, a process time required to assign the touch ID increases when the number of touch points increases. Hence, a touch report rate decreases, and the touch latency performance suffers.

As shown in FIGS. 1 to 3, a method for reducing an area of comparison objects to adjacent touch groups has been proposed to solve the above-described problem. The proposed related art method divides touch inputs into previously set touch groups and compares touch points of each touch group with all of the touch IDs of the adjacent touch groups. In FIG. 1, small rectangles with shading indicate the touch points. In FIGS. 1 and 2, the second, the seventh to the ninth, and the twelfth to the fourteenth groups GP2, GP7-GP9, and GP12-GP14 each have the touch points. In FIG. 2, the group having the touch points is denoted by a circle.

The number of touch points belonging to the second group GP2 is five, and the total number of touch points belonging to the adjacent groups GP1, GP2, GP6, GP7, and GP8, which are compared with the second group GP2, is ten. The total number of touch points in the second group GP2 and its adjacent groups is 15. Thus, the number of comparison processes for assigning the touch points of the second group GP2 to a touch ID is 255 (=15*15). In the same manner as the second group GP2, the number of touch points belonging to the eighth group GP8 is five, and the total number of touch points belonging to the adjacent groups GP2-GP4, GP7, GP9, and GP12-GP14, which are compared with the eighth group GP8, is 28. The total number of touch points in the eighth group GP8 and its adjacent groups is 33. Thus, the number of comparison processes for assigning the touch points of the eighth group GP8 to the touch ID is 1089 (=33*33).

The proposed related art method compares adjacent touch groups, instead of the entire area of the touch screen, and can therefore reduce the area of the comparison objects. However, when a large number of adjacent touch groups (i.e., a large number of comparison touch groups) are used and the touch points are concentrated on the comparison touch groups (for example, the group GP1 of FIG. 3), it is difficult to reduce the process time.

When the touch report rate decreases and the touch latency performance suffers, it is difficult to implement a fast response to a touch input.

SUMMARY

Accordingly, the present invention is directed to a a multi-touch sensitive display device and a method for assigning a touch identification of the multi-touch sensitive display device that substantially obviate one or more of the problems due to limitations and disadvantages of the related art.

An object of the present invention is to provide a multi-touch sensitive display device and a method for assigning a touch identification in the multi-touch sensitive display device that are capable of reducing a process time even when the number of touch points increases, for example, due to the touch screen having a larger area, thereby increasing the touch report rate and enhancing the touch latency performance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for assigning a touch identification in a multi-touch sensitive display device having a touch screen with a plurality of touch sensors comprises: applying a touch driving signal to the touch sensors of the touch screen and generating raw touch data; detecting a plurality of touch points based on the raw touch data and respectively assigning temporary identifications (IDs) to the touch points; grouping the touch points based on a difference in distances between the touch points to form a plurality of touch groups; forming a plurality of adaptive touch groups, each based on a respective one of the touch groups; setting a comparison block including one or more of the adaptive touch groups contacting or overlapping each other; and matching the temporary ID assigned to one of the touch points within the comparison block in the current frame to one of a plurality of touch IDs within the comparison block in a previous frame by comparing the one touch point in the current frame only to touch points represented by the touch IDs of the previous frame within the comparison block.

In another aspect, a multi-touch sensitive display device comprising: a touch screen having a plurality of touch sensors; and a touch driving device configured to apply a touch driving signal to the touch sensors and to sense one or more touch points, the touch driving device including a touch sensing circuit configured to sense a change in capacitance of one or more of the touch sensors and to generate raw touch data based on the change in capacitance, and a touch analyzer configured to detect a plurality of touch points based on the raw touch data and to respectively assign temporary identifications (IDs) to the touch points, to group the touch points based on a difference in distances between the touch points to form a plurality of touch groups, to form a plurality of adaptive touch groups respectively based on the touch groups, to set a comparison block including one or more of the adaptive touch groups contacting or overlapping each other, and to match the temporary ID assigned to one of the touch points within the comparison block in the current frame to one of a plurality of touch IDs within the comparison block in a previous frame by comparing the one touch point in the current frame only to touch points represented by the touch IDs of the previous frame within the comparison block.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EXAMPLE EMBODIMENTS

Reference will now be made in detail to embodiments of the invention, examples of which are illustrated in the accompanying drawings. Wherever possible, the same reference numbers will be used throughout the drawings to refer to the same or like elements. Also, detailed description of known art may be omitted.

Figure 4:
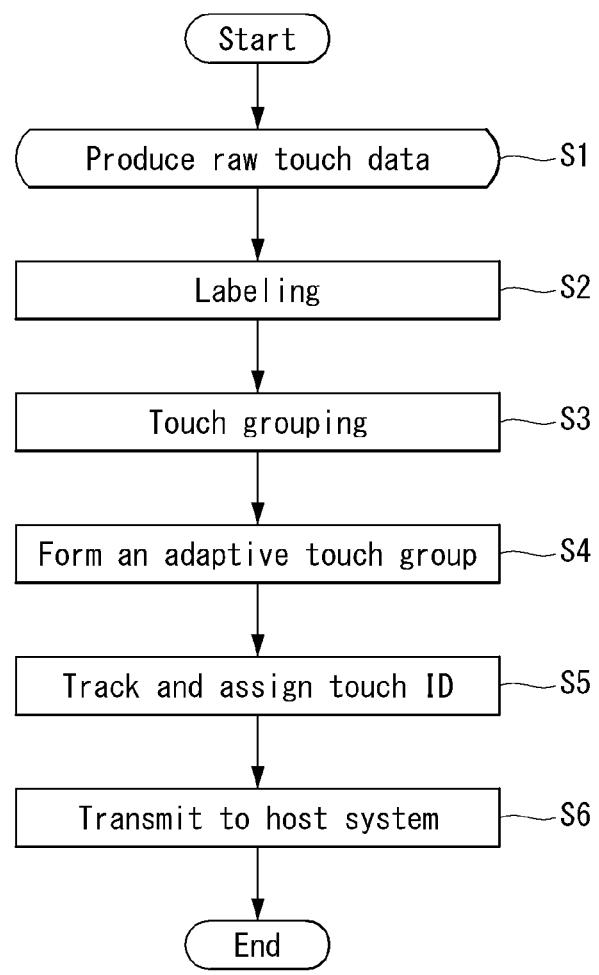
FIG. 4 illustrates a touch ID assignment method for a multi-touch sensitive display device according to an example embodiment of the invention.

FIG. 4 illustrates a touch identification (ID) assignment method for a multi-touch sensitive display device according to an example embodiment of the invention. FIGS. 5 to 10 illustrate in more detail the touch ID assignment method of FIG. 4, using various examples.

As illustrated in FIG. 4, the touch ID assignment method for the multi-touch sensitive display device according to the example embodiment of the invention includes a raw touch data producing step S1, a labeling step S2, a touch grouping step S3, an adaptive touch group forming step S4, a touch ID tracking and assigning step S5, and a transmission step S6.

The raw touch data producing step S1 drives touch sensors included in a touch screen and produces raw touch data. The touch screen may be configured independently from a display panel for displaying images, or may be embedded or integrated in a pixel array of the display panel. The touch screen includes a plurality of touch sensors each having a capacitance. The capacitance may be categorized into a self-capacitance and a mutual capacitance. The self-capacitance may be formed along a conductor line of a single layer formed in one direction, and the mutual capacitance may be formed between two conductor lines perpendicular to each other.

In the raw touch data producing step S1, a touch driving signal is applied to the touch sensors, changing an amount of charges in the touch sensors. Then, a change in the amount of charges in the touch sensors is received, and an analog-to-digital conversion is performed on the change amount to produce the raw touch data.

Figure 5:
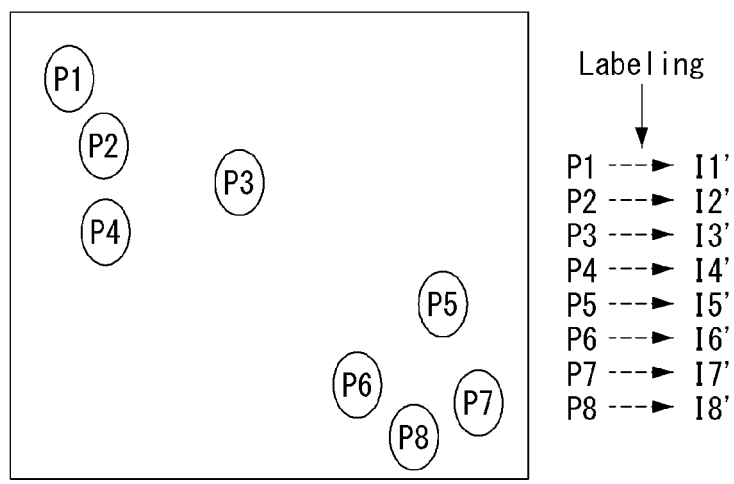
FIG. 5 illustrates an example labeling operation for assigning different temporary IDs to touch points.
Figures 6A, 6B:
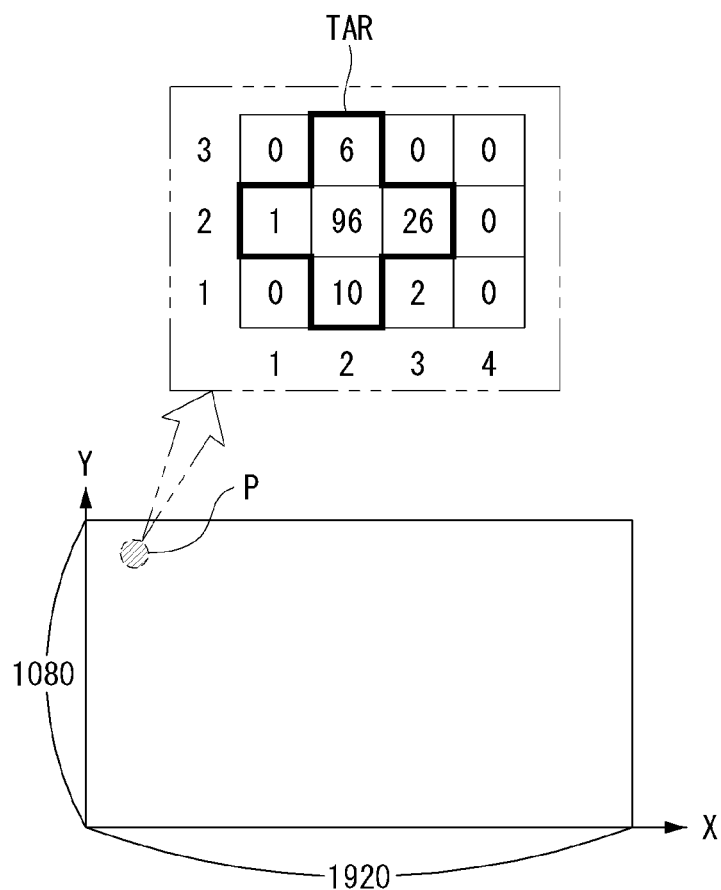
FIGS. 6A and 6B illustrate an example method for detecting touch points.

As shown in FIG. 5, in the labeling step S2, touch points P1 to P8 are detected based on the raw touch data, and temporary IDs I1' to I8' are respectively assigned to the touch points P1 to P8. For this, as shown in FIG. 6A, for example, the labeling step S2 may include processing the raw touch data based on a predetermined critical value and extracting touch areas TAR. Further, as shown in FIG. 6B, for example, the labeling step S2 may also include calculating the center of mass of each of the touch areas TAR and detecting the touch points P1 to P8 based on the result of the calculation.

As shown in FIG. 6B, one touch area TAR may include a plurality of node sensing values. The center of mass of the touch area TAR is calculated so as to represent the touch area TAR as touch points. The formula for obtaining the center of mass is $\Sigma MiRi/\Sigma Mi$, where "i" is a positive integer, M is the node sensing value, and R is a position of each node sensing value. For example, as shown in FIG. 6B, the x and y coordinates (x, y) of the center of mass are (2.22, 2.09), where $x=(1*1+6*2+96*2+26*3+10*2)/(1+6+96+26+10)=2.22$ and $y=(1*2+6*3+96*2+26*2+10*1)/(1+6+96+26+10)=2.09$. The coordinate (x, y) of the center of mass is the touch point P.

Figure 7:
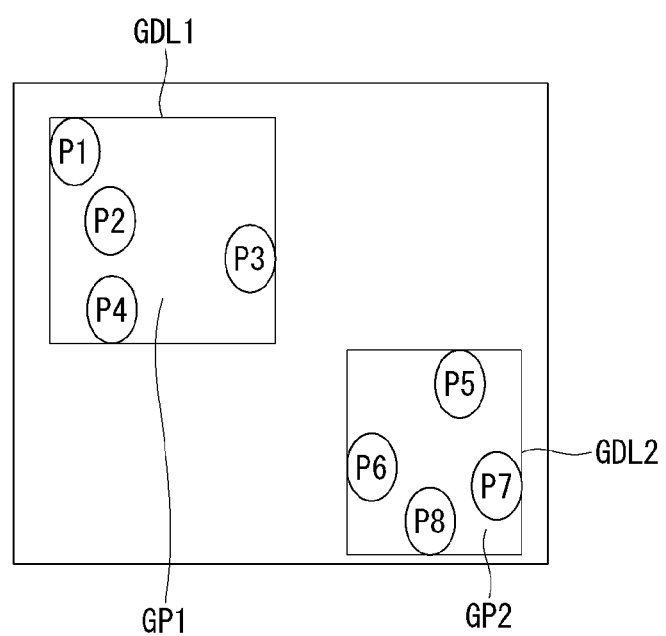
FIG. 7 shows examples of touch groups and of group division lines respectively surrounding the touch groups.
Figure 8A:
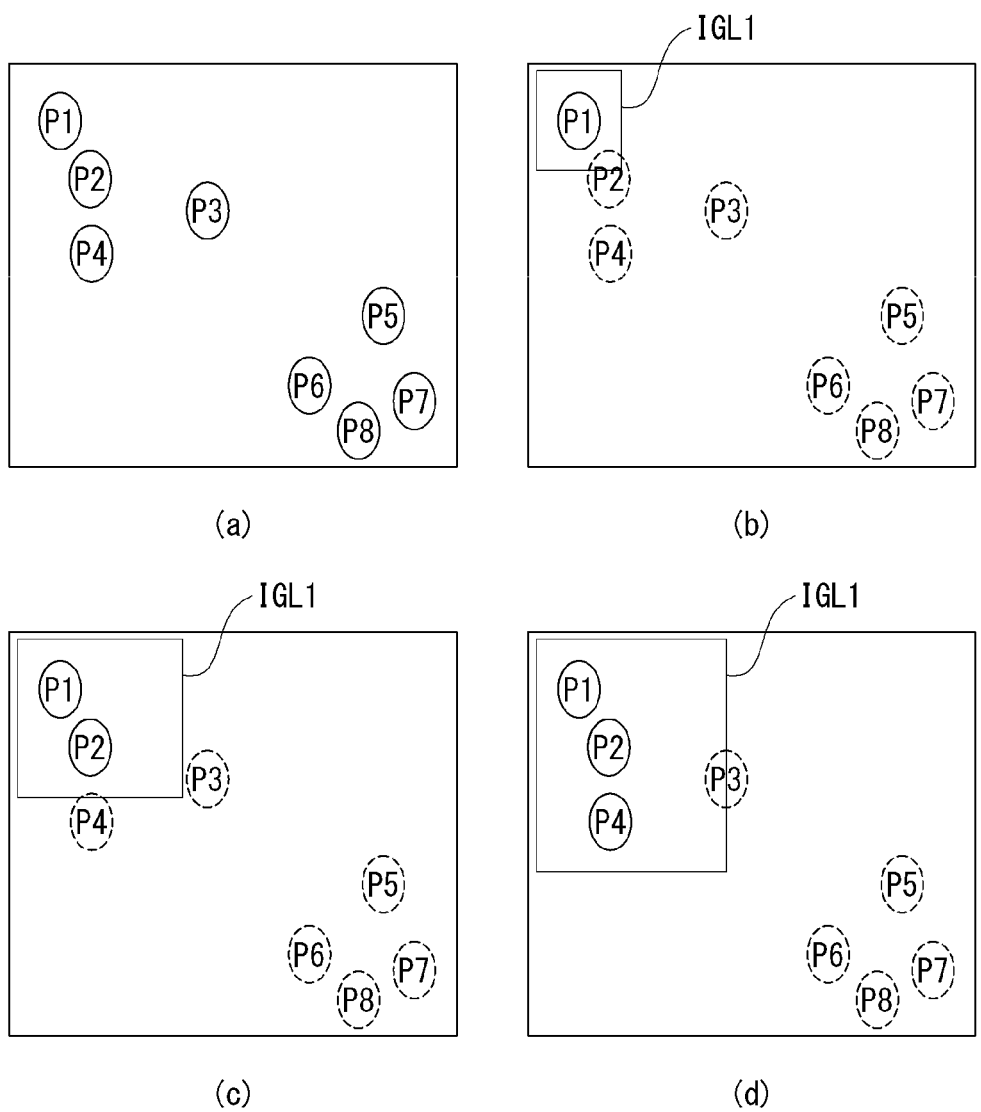
FIGS. 8A and 8B illustrate an example method for grouping touch points to form touch groups.
Figure 8B:
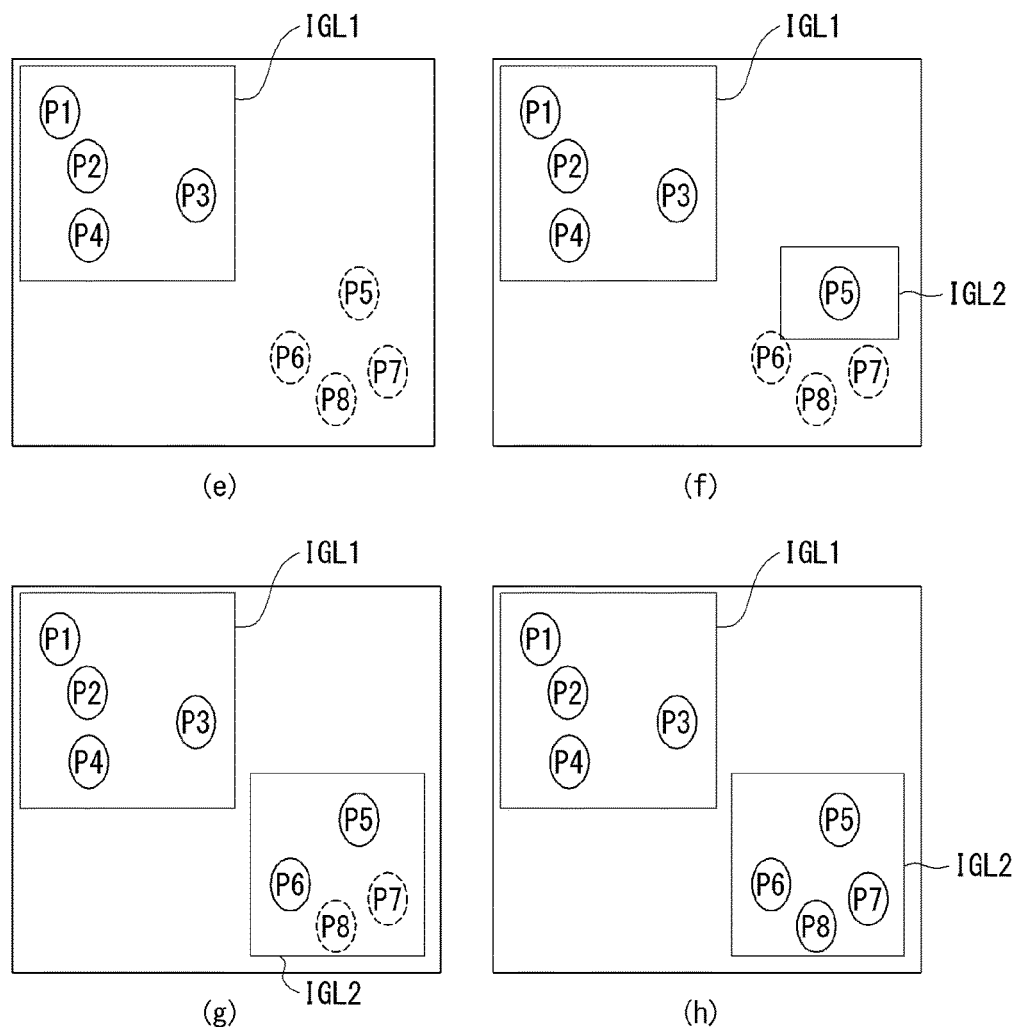

The touch grouping step S3 groups the touch points P1 to P8 based on a difference in distances between the touch points P1 to P8 to form a plurality of touch groups, for example, GP1 and GP2 as shown in FIG. 7. As shown in FIGS. 8A and 8B, for example, the touch grouping step S3 may include setting imaginary group guide lines IGL1 and IGL2 each surrounding at least one touch point, and extending the respective group guidelines IGL1 and IGL2 at a predetermined ratio while determining whether or not the group guide lines IGL1 and IGL2 overlap any of the touch points P1 to P8. When the group guide lines IGL1 and IGL2 no longer overlap any of the touch points P1 to P8, the touch points P1-P4 and P5-P8 respectively surrounded by the group guide lines IGL1 and IGL2 form the individual touch groups GP1 and GP2, respectively. FIGS. 8A and 8B illustrate this example progression. Because a range of the touch group is adaptively (or flexibly) determined based on the difference in distances between the touch points in the touch grouping step S3, the example embodiment of the invention can significantly reduce an area of comparison objects, compared to the related art device.

More specifically, the touch grouping step S3 may include performing a grouping process on the touch points P1 to P8 shown in part (a) of FIG. 8A. As shown in part (b) of FIG. 8A, in the touch grouping step S3, the first group guide line IGL1 may be set to surround the first touch point P1. In this instance, because a portion of the second touch point P2 overlaps the first group guide line IGL1, the touch grouping step S3 may include extending the first group guide line IGL1 at a predetermined ratio so that the first extended first group guide line IGL1 surrounds both the first and the second touch points P1 and P2 as shown in part (c) of FIG. 8A. In the example embodiment disclosed herein, the predetermined ratio may be previously determined depending on at least one of a touch report rate and a maximum touch drawing speed. Next, because the first extended first group guide line IGL1 now overlaps a portion of the fourth touch point P4, the touch grouping step S3 may include extending the first extended first group guide line IGL1 at the predetermined ratio so that the second extended first group guide line IGL1 surrounds all of the first, the second, and the fourth touch points P1, P2, and P4 as shown in part (d) of FIG. 8A. Then, because the second extended first group guide line IGL1 now overlaps a portion of the third touch point P3, the touch grouping step S3 may include extending the second extended first group guide line IGL1 at the predetermined ratio so that the third extended first group guide line IGL1 surrounds all of the first to the fourth touch points P1 to P4 as shown in part (e) of FIG. 8B. Because the third extended first group guide line IGL1 no longer overlaps another touch point, the touch grouping step S3 may include setting the first to the fourth touch points P1 to P4 surrounded by the third extended first group guide line IGL1 as forming the first touch group GP1.

Next, as shown in part (f) of FIG. 8B, the touch grouping step S3 includes determining the second group guide line IGL2 surrounding the fifth touch point P5. In this instance, because a portion of the sixth touch point P6 overlaps the second group guide line IGL2, the touch grouping step S3 may include extending the second group guide line IGL2 at the predetermined ratio so that the first extended second group guide line IGL2 surrounds both the fifth and the sixth touch points P5 and P6 as shown in part (g) of FIG. 8B. When the seventh and the eighth touch points P7 and P8 are positioned close to the sixth touch point P6, the seventh and the eighth touch points P7 and P8 may be included in the first extended second group guide line IGL2 as shown in part (g) of FIG. 8B. Thus, as shown in (h) of FIG. 8B, the touch grouping step S3 may include setting the fifth to the eighth touch points P5 to P8 surrounded by the first extended second group guide line IGL2 as forming the second touch group GP2.

Figure 9:
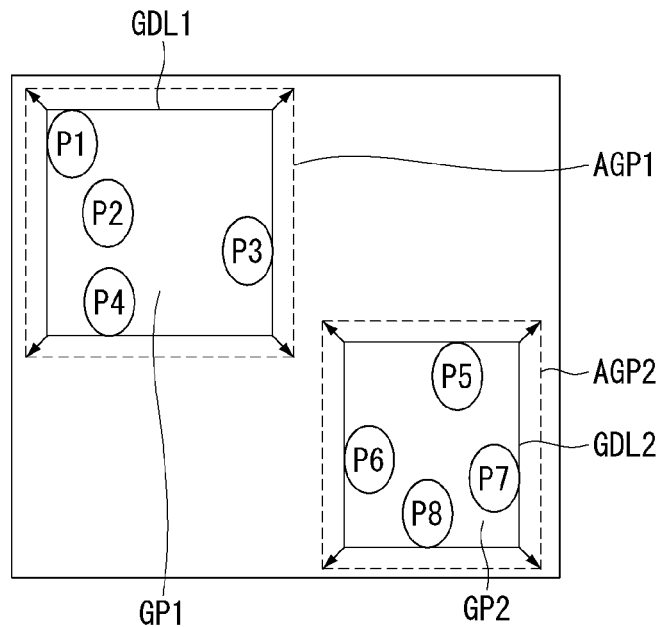
FIG. 9 shows examples of touch groups including touch points, of group division lines surrounding the touch groups, and of adaptive touch groups extended from the group division lines.

As shown in FIG. 9, the touch grouping step S3 may include setting group division lines GDL1 and GDL2 respectively surrounding the touch groups GP1 and GP2 after the touch grouping is completed. Each of the group division lines GDL1 and GDL2 may have a quadrilateral shape by connecting outermost edges of the touch points belonging to the same respective touch group. Each of the group division lines GDL1 and GDL2 may surround the touch points belonging to the same respective touch group within a minimum area.

As shown in FIG. 9, the adaptive touch group forming step S4 may include arranging the touch points P1-P4 and P5-P8 in the touch groups GP1 and GP2, respectively, and then extending the group division lines GDL1 and GDL2 at a predetermined ratio, thereby forming adaptive touch groups AGP1 and AGP2. An area of the first adaptive touch group AGP1 may be greater than an area of the first touch group GP1, which shares the touch points P1-P4 with the first adaptive touch group AGP1. Further, an area of the second adaptive touch group AGP2 may be greater than an area of the second touch group GP2, which shares the touch points P5-P8 with the second adaptive touch group AGP2.

A reason for forming the adaptive touch group having an area greater than the area of the touch group is to flexibly respond to changes in the location of touch points over time, for example, in a drawing operation. Although the same touch group may be arranged at different locations in adjacent frames, the adaptive touch group forming step S4 forms the adaptive touch group in consideration of possible changes in the location of the touch group in the adjacent frames. If the adaptive touch group is not formed, an error may worsen when the touch IDs are assigned in the subsequent touch ID tracking step. In some cases, the process for assigning the touch IDs may become impossible.

An increase ratio of the area of the adaptive touch group over the area of the corresponding touch group may be previously determined depending on at least one of the touch report rate and the maximum touch drawing speed.

Figure 10:
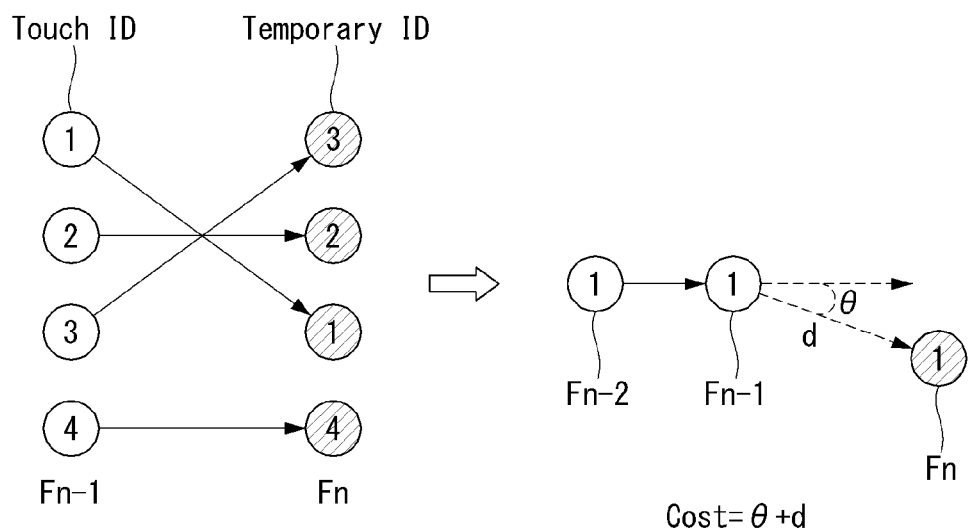
FIG. 10 shows an example of matching temporary IDs of a current frame to touch IDs of a previous frame.

As shown in FIG. 10, the touch ID tracking and assigning step S5 may include setting one or more comparison blocks BLK (refer to FIG. 11), each including one or more adaptive touch groups AGP contacting or overlapping each other, and matching temporary IDs of a current frame Fn, which are respectively given to touch points in each respective comparison block BLK, to touch IDs of a previous frame Fn−1 using only the touch points in the same comparison block BLK as comparison objects.

The touch ID tracking and assigning step S5 may include performing a one-to-one comparison between each of the temporary IDs (or the respective touch point represented by each temporary ID) of the current frame Fn and each of the touch IDs (or the respective touch point represented by each touch ID) of the previous frame Fn−1 in a given comparison block, and calculating a cost by adding an angle θ and a distance d between the temporary ID (or the touch point represented by the temporary ID) and the touch ID (or the touch point represented by the touch ID) which are compared with each other. The touch ID tracking and assigning step S5 may include matching each temporary ID with the touch ID resulting in the minimum cost, among all the touch IDs in the same comparison block, when compared with that temporary ID. The touch ID tracking and assigning step S5 may also include connecting touch coordinates of a given user, which may repeatedly change during a plurality of frame periods, to the same touch ID.

Figures 11, 12:
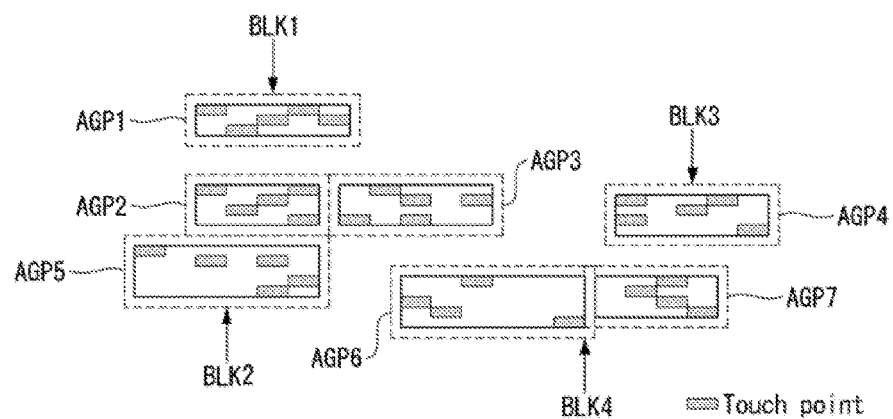
FIG. 11 shows example comparison blocks, each including one or more adaptive touch groups contacting or overlapping each other.
FIG. 12 shows the number of comparison processes for assigning touch IDs in adaptive touch groups of FIG. 11.

The transmission step S6 includes transmitting the touch coordinates, to which the touch ID is assigned, to the host system 18 as a digital data in HID format. FIG. 11 shows comparison blocks formed based on adaptive touch groups contacting or overlapping each other. FIG. 12 shows the number of comparison processes for assigning touch IDs in the adaptive touch groups of FIG. 11.

Figures 1, 2:
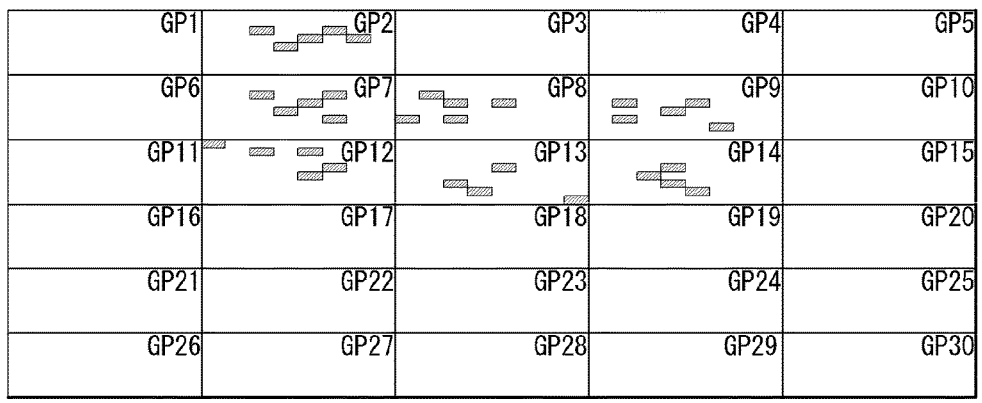
FIGS. 1 to 3 show an example of related art touch identification (ID) assignment technology.
Figure 3:
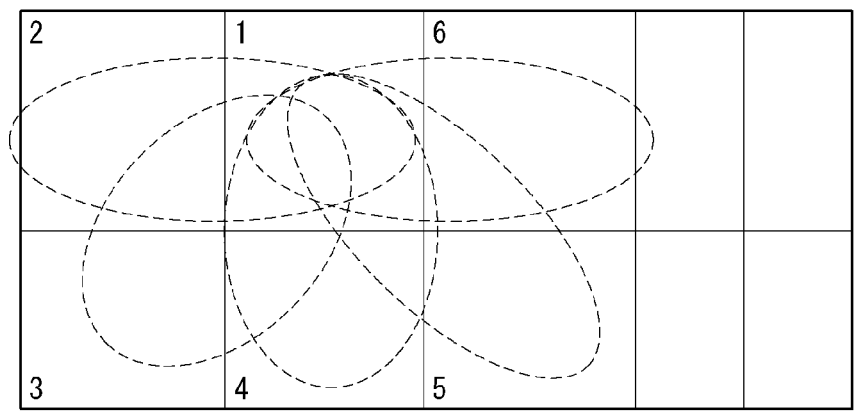

As illustrated in FIGS. 11 and 12, the example embodiment of the invention may set comparison blocks BLK1 to BLK4 based on adaptive touch groups contacting or overlapping each other, and use only touch points of each of the comparison blocks BLK1 to BLK4 as comparison objects. The number of comparison processes with respect to the same number of touch points as the related art device illustrated in FIG. 1 is compared with the number of comparison processes for the related art device shown in FIG. 2, as follows. The first to the seventh adaptive touch groups AGP1 to AGP7 according to the example embodiment of the present invention collectively include the same number of touch points as the groups GP2, GP7, GP8, GP9, GP12, GP13, and GP14 of FIG. 2 combined.

The first comparison block BLK1 includes the first adaptive touch group AGP1, and the total number of touch points belonging to the first comparison block BLK1 is 5. Thus, the number of comparison processes with respect to the touch points of the first adaptive touch group AGP1 is 25 (=5 (the number of touch points in a previous frame)*5 (the number of touch points in the current frame)). Namely, the 25 comparison processes with respect to the touch points of the first adaptive touch group AGP1 according to the example embodiment of the present invention are dramatically less than the 225 comparison processes with respect to the touch points of the group GP2 in the related art device as shown in FIGS. 1 and 2.

The second comparison block BLK2 includes the second, the third, and the fifth adaptive touch groups AGP2, AGP3, and AGP5, and the total number of touch points belonging to the second comparison block BLK2 is 15. The number of comparison processes with respect to the touch points of each of the second, the third, and the fifth adaptive touch groups AGP2, AGP3, and AGP5 is therefore 225 (=15 (the number of touch points in a previous frame)*15 (the number of touch points in a current frame)). Namely, the 225 comparison processes according to the example embodiment of the present invention are dramatically less than the 576 comparison processes with respect to the touch points of the group GP7, the 1089 comparison processes with respect to the touch points of the group GP8, and the 361 comparison processes with respect to the touch points of the group GP12 in the related art device as shown in FIGS. 1 and 2.

The third comparison block BLK3 includes the fourth adaptive touch group AGP4, and the total number of touch points belonging to the third comparison block BLK3 is 5. Thus, the number of comparison processes with respect to the touch points of the fourth adaptive touch group AGP4 is 25 (=5 (the number of touch points in a previous frame)*5 (the number of touch points in a current frame)). Namely, the 25 comparison processes according to the example embodiment of the present invention are dramatically less than the 324 comparison processes with respect to the touch points of the group GP9 in the related art device shown in FIGS. 1 and 2.

The fourth comparison block BLK4 includes the sixth and the seventh adaptive touch groups AGP6 and AGP7, and the total number of touch points belonging to the fourth comparison block BLK4 is 8. Thus, the number of comparison processes with respect to the touch points of each of the sixth and the seventh adaptive touch groups AGP6 and AGP7 is 64 (=8 (the number of touch points in a previous frame)*8 (the number of touch points in a current frame)). Namely, the 64 comparison processes according to the example embodiment of the present invention are dramatically less than the 784 comparison processes with respect to the touch points of the group GP13 and the 324 comparison processes with respect to the touch points of the group GP14 in the related art device illustrated in FIGS. 1 and 2.

As described above, the example embodiment of the present invention is capable of adaptively (or flexibly) determining the range of a touch group based on the difference in distances between the touch points and can reduce the area of the comparison objects. In particular, the example embodiment of the present invention may use only the adaptive touch groups contacting or overlapping each other as the comparison objects and exclude the other adaptive touch groups (i.e., the adaptive groups not contacting or overlapping a given adaptive group) from the comparison objects. Hence, the example embodiment of the present invention can greatly reduce the number of comparison processes for assigning the touch IDs, compared to the related art device. The example embodiment can improve a touch report rate and a touch latency performance by reducing the amount of time for assigning the touch IDs and can therefore increase a touch sensing speed. Also, the example embodiment of the present invention can reduce power consumption by simplifying the comparison process.

FIGS. 13 to 16 show a multi-touch sensitive display device according to another example embodiment of the present invention. FIG. 17 shows a detailed example configuration of a touch analyzer of FIG. 13.

As illustrated in FIGS. 13 to 16, the multi-touch sensitive display device according to an example embodiment of the present invention may be implemented based on a flat panel display, such as a liquid crystal display (LCD), a field emission display (FED), a plasma display panel (PDP), an organic light emitting diode display, and an electrophoresis display (EPD). In the following description, the example embodiment of the invention will be described using the liquid crystal display as an example of the flat panel display. However, the example embodiment may be applied to other types of flat panel displays in a similar manner.

The multi-touch sensitive display device includes a display module and a touch module. The display module may include a display panel DIS, a display driving circuit, and a host system 18.

The display panel DIS may include a liquid crystal layer formed between an upper substrate and a lower substrate. A pixel array of the display panel DIS includes pixels formed in pixel areas defined by data lines D1 to Dm and gate lines G1 to Gn, where m and n are each a positive integer. Each pixel may include, among others, thin film transistors (TFTs) formed at crossings of the data lines D1 to Dm and the gate lines G1 to Gn, a pixel electrode charged with a data voltage, and a storage capacitor Cst which is connected to the pixel electrode and holds a voltage of a liquid crystal cell.

Black matrixes, color filters, and other elements may be formed on the upper substrate of the display panel DIS. The lower substrate of the display panel DIS may be configured in a COT (color filter on TFT) structure. In this instance, the black matrixes and the color filters may be formed on the lower substrate of the display panel DIS. A common electrode, to which a common voltage is supplied, may be formed on the upper substrate or the lower substrate of the display panel DIS. Polarizing plates may be respectively attached to the upper substrate and the lower substrate of the display panel DIS. Alignment layers for setting a pre-tilt angle of liquid crystals may be respectively formed on the inner surfaces of the upper substrate and the lower substrate contacting the liquid crystals. A column spacer may be formed between the upper substrate and the lower substrate of the display panel DIS to keep cell gaps of the liquid crystal cells constant.

A backlight unit may be disposed under a back surface of the display panel DIS or at one or more sides of the display panel DIS. The backlight unit may be implemented as one of an edge type backlight unit and a direct type backlight unit to irradiate light onto the display panel DIS. The display panel DIS may be implemented in any known mode, including a twisted nematic (TN) mode, a vertical alignment (VA) mode, an in-plane switching (IPS) mode, a fringe field switching (FFS) mode, and so on.

The display driving circuit may include a data driving circuit 12 and a scan driving circuit 14. The display driving circuit may also include a timing controller 16. The display driving circuit receives digital video data RGB of an input image and applies corresponding data voltages to the pixels of the display panel DIS. The data driving circuit 12 may convert the digital video data RGB received from the timing controller 16 into positive and negative analog gamma compensation voltages, and outputs the data voltages. The data driving circuit 12 may then supply the data voltages to the data lines D1 to Dm. The scan driving circuit 14 may sequentially supply a gate pulse (or a scan pulse) synchronized with the data voltages to the gate lines G1 to Gn, and select pixel lines of the display panel DIS to which the data voltages are applied.

The timing controller 16 may receive timing signals, such as a vertical sync signal Vsync, a horizontal sync signal Hsync, a data enable signal DE, and a main clock MCLK, from the host system 18. The timing controller 16 may synchronize operation timings of the data driving circuit 12 and the scan driving circuit 14 with each other. The timing controller 16 may generates data timing control signals and scan timing control signals for respectively controlling the operation timings of the data driving circuit 12 and the scan driving circuit 14. The data timing control signals may include, among others, a source sampling clock SSC, a source output enable signal SOE, and a polarity control signal POL. The scan timing control signals may includes, among others, a gate start pulse GSP, a gate shift clock GSC, and a gate output enable signal GOE.

The host system 18 may be implemented as a phone system, a television system, a set-top box, a navigation system, a DVD player, a Blu-ray player, a personal computer (PC), a home theater system, or any other system capable of providing an image or video data. The host system 18 may include a system on chip (SoC) including a scaler and convert the digital video data RGB of the input image into a format suitable for displaying on the display panel DIS. The host system 18 may transmit the digital video data RGB and the timing signals Vsync, Hsync, DE, and MCLK to the timing controller 16. Further, the host system 18 may execute an application associated with touch coordinate information TDATA(XY) received from a touch driving device 20. A touch driving sync signal SYNC may be produced by the timing controller 16 and may be transmitted to the touch driving device 20.

Figure 16:
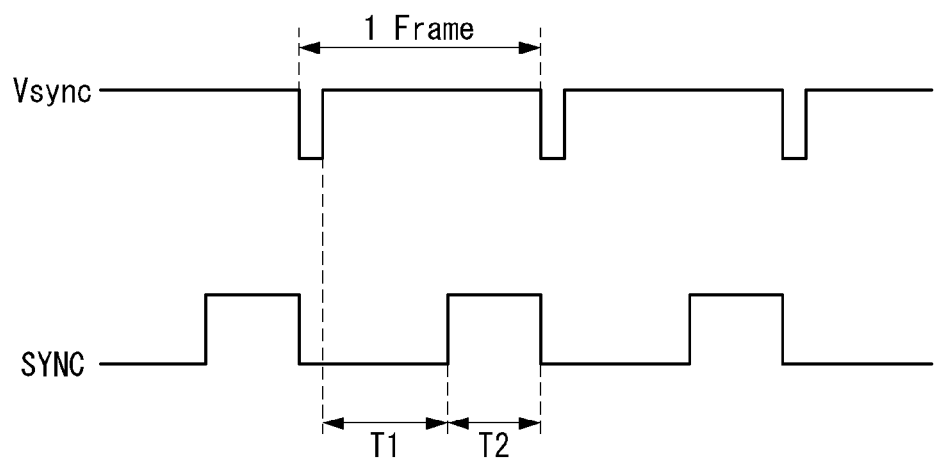
FIG. 16 shows an example of one frame period being time-divided into a display driving period and a touch sensor driving period.
Figure 17:
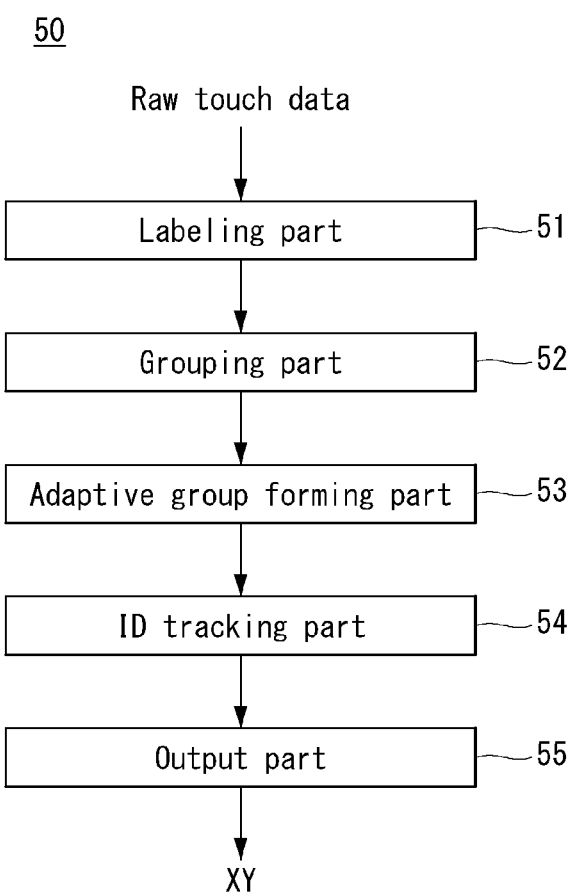
FIG. 17 shows a detailed example configuration of a touch analyzer of FIG. 13.

As shown in FIG. 16, the timing controller 16 may produces the touch driving sync signal SYNC based on the vertical sync signal Vsync and may control operations of the display driving circuit and the touch driving device 20. The timing controller 16 may time-divide one frame period, for example, into a display driving period T1 and a touch sensor driving period T2 based on the touch driving sync signal SYNC, and thus may reduce a display noise mixed in a touch sensing signal received from the touch sensors.

During the display driving period T1, the data driving circuit 12 may supply the data voltages to the data lines D1 to Dm under the control of the timing controller 16, and the scan driving circuit 14 may sequentially supply the gate pulse synchronized with the data voltage to the gate lines G1 to Gn under the control of the timing controller 16. During the display driving period T1, the touch driving device 20 does not apply touch driving signals.

During the touch sensor driving period T2, the touch driving device 20 may apply a touch driving signal to the touch sensors of a touch screen TSP and sense a location of a touch (or proximity) input. During the touch sensor driving period T2, the display driving circuits 12, 14, and 16 may supply an AC signal having the same amplitude and the same phase as the touch sensor driving signal to the signal lines D1 to Dm and G1 to Gn, so as to minimize a parasitic capacitance between the signal lines D1 to Dm and G1 to Gn connected to the pixels and the touch sensors. In this instance, the display noise mixed in the touch sensing signal may be further reduced, and the accuracy of the touch sensing may significantly improve.

The touch module includes the touch screen TSP and the touch driving device 20. The touch screen TSP may include a plurality of touch sensors each having a capacitance. The capacitance may be a self-capacitance or a mutual capacitance.

Figure 14:
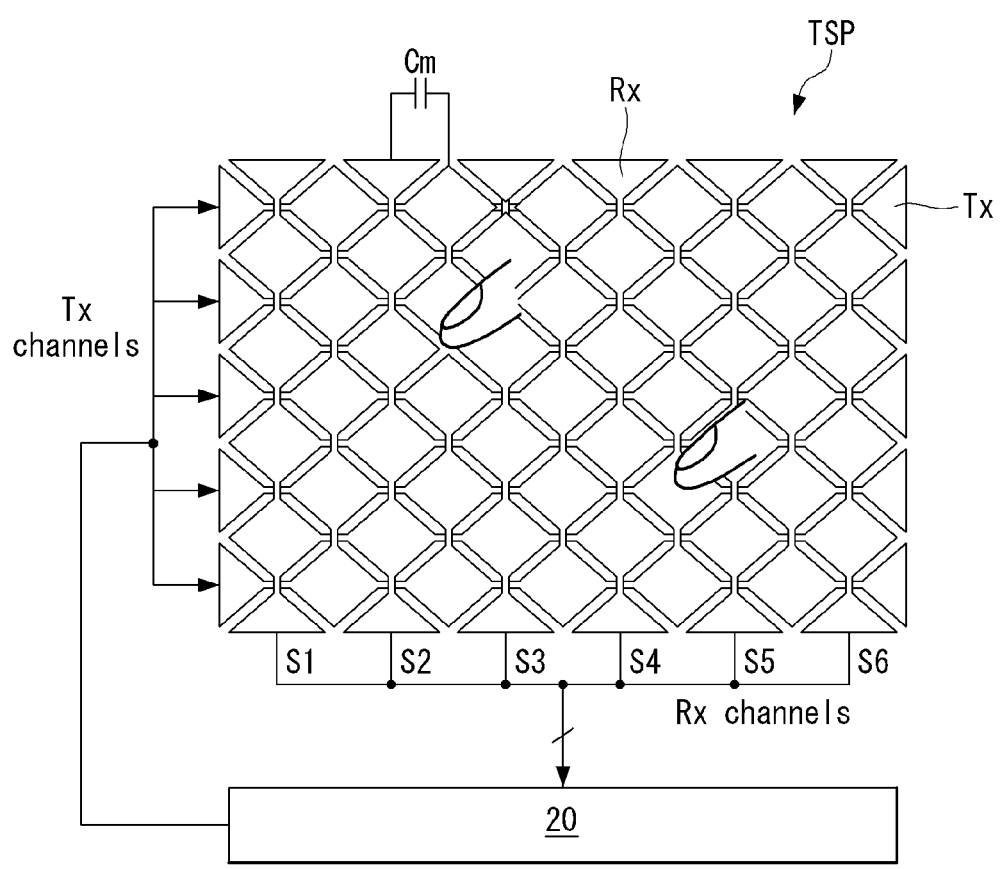
FIG. 14 shows an example of a touch screen including mutual capacitive touch sensors.

As shown in FIG. 14, the touch screen TSP incorporating mutual capacitive touch sensors may include Tx electrode lines, Rx electrode lines crossing the Tx electrode lines, and mutual capacitive touch sensors Cm respectively formed at crossings of the Tx electrode lines and the Rx electrode lines. The Tx electrode lines may be driving signal lines which apply the touch driving signal to each of the touch sensors Cm and supply charges to the touch sensors Cm. The Rx electrode lines may be sensor lines which are connected to the touch sensors Cm and supply charges of the touch sensors Cm to the touch driving device 20. A mutual capacitance sensing method may apply a touch driving signal to Tx electrodes through the Tx electrode lines, supplying charges to the touch sensors Cm, and sense changes in capacitance through Rx electrodes and the Rx electrode lines in synchronization with the touch driving signal, thereby sensing a touch input.

Figure 15:
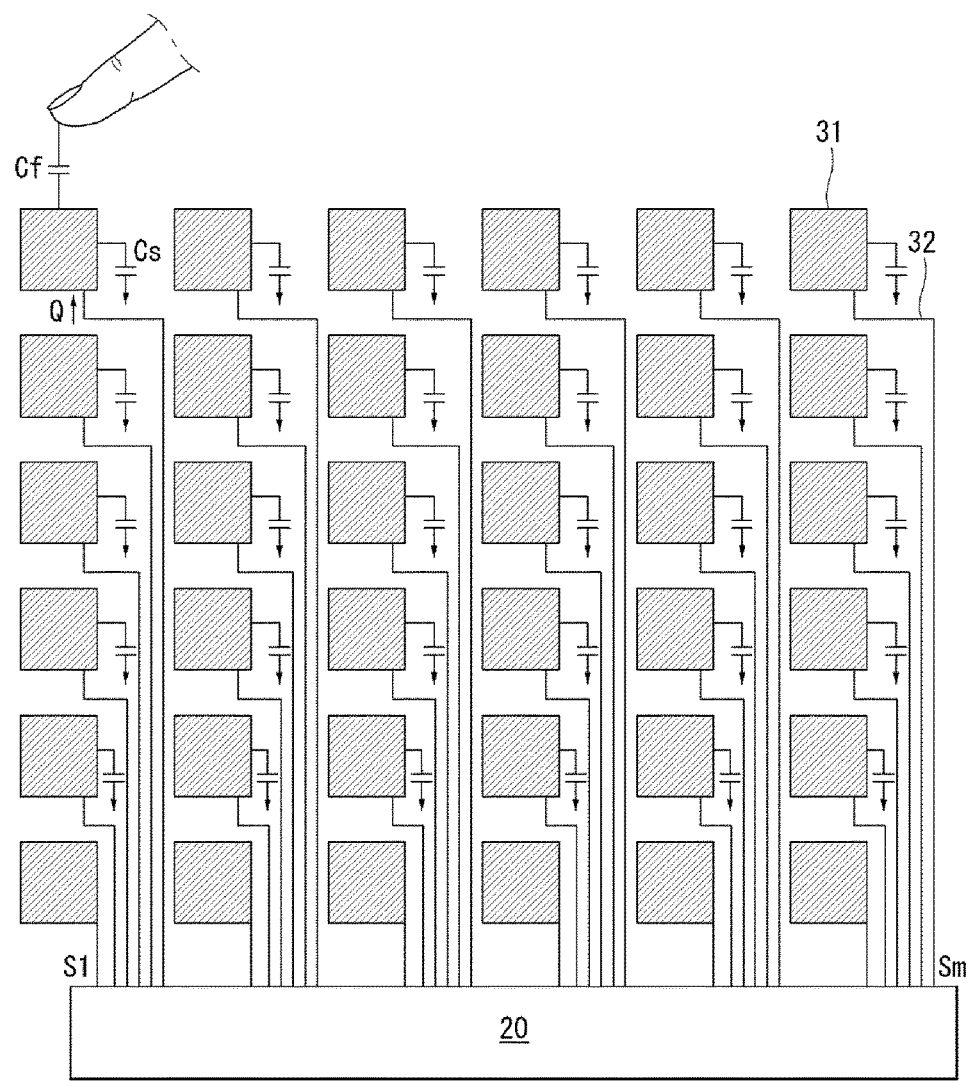
FIG. 15 shows an example of a touch screen including self-capacitance touch sensors.

As shown in FIG. 15, in the touch screen TSP incorporating self-capacitance touch sensors Cs, touch electrodes 31 may be respectively connected to sensor lines 32 formed in one direction. The self-capacitance touch sensors Cs each have a capacitance formed in each electrode 31. A self-capacitance sensing method accumulates charges Q on the touch sensors Cs when a touch driving signal is applied to the touch electrodes 31 through the sensor lines 32. In this instance, when a user touches the touch electrodes 31 with his or her finger or another conductor, a parasitic capacitance Cf is connected to the self-capacitance touch sensors Cs, and a total capacitance changes. Thus, the self-capacitance sensing method may decide whether or not the user touches the touch sensor Cs through a difference in capacitance between the touch sensor Cs the user touches and the touch sensor Cs the user does not touch.

The touch sensors Cm or Cs of the touch screen TSP may be embedded in the pixel array of the display panel DIS, but the example embodiment is not limited to such an arrangement. For example, the touch screen TSP may instead be attached on an upper polarizing plate of the display panel DIS or be formed between the upper polarizing plate and the upper substrate of the display panel DIS.

The touch driving device 20 may sense a change in the amount of charges in the touch sensor before and after a touch operation, and determine whether or not the touch operation using a conductive pointer, for example, a finger or a stylus pen, is performed and a location of the touch operation. The touch driving device 20 may include a touch sensing circuit 40 and a touch analyzer 50.

The touch sensing circuit 40 may measure a change in a voltage waveform received from the touch sensors and convert the change into a digital data. The touch sensing circuit 40 may include an amplifier to amplify the received voltages from the touch sensors, an integrator to accumulate the amplified voltages, and an analog-to-digital converter (ADC) to convert the voltage of the integrator into a digital data. The digital data output from the ADC may be the raw touch data and may be transmitted to the touch analyzer 50.

The touch analyzer 50 may calculate coordinates of each touch input and transmit touch data including the coordinate information of each touch input to the host system 18. In particular, the touch analyzer 50 may divide a plurality of touch inputs received from a plurality of users using an ID tracking technology and then match touch IDs of a current frame to touch IDs of a previous frame. The touch analyzer 50 may include the touch ID information in the touch data transmitted to the host system 18.

As shown in FIG. 17, the touch analyzer 50 may include a labeling part 51, a grouping part 52, an adaptive group forming part 53, an ID tracking part 54, and an output part 55. The labeling part 51 detects touch points based on raw touch data from the touch sensing circuit 40 and assigns different temporary IDs to the touch points. The labeling part 51 processes the raw touch data based on a predetermined critical value and extracts touch areas. The labeling part 51 may detect the touch points based on the center of mass of each touch area.

The grouping part 52 groups the touch points based on a difference in distances between the touch points to form a plurality of touch groups. The grouping part 52 sets group division lines respectively surrounding the touch groups. More specifically, the grouping part 52 may determine imaginary group guide lines each surrounding at least one touch point and extend the group guide lines at a predetermined ratio while determining whether or not the group guide lines overlap another touch point. When the group guide lines do not overlap another touch point, the grouping part 52 may set one or more touch points surrounded by each group guide line to form one touch group. Once the touch groups are formed, the grouping part 52 may set group division lines respectively surrounding the touch groups. Each of the group division lines may have a quadrilateral shape by connecting outermost edges of the touch points belonging to the same respective touch group. Each of the group division lines may surround the touch points belonging to the same respective touch group within a minimum area.

The adaptive group forming part 53 arranges the corresponding touch points in each touch group and then extends the group division lines at a predetermined ratio, thereby forming adaptive touch groups. In this instance, an area of each adaptive touch group may be greater than an area of the corresponding touch group, which shares the same touch points with the adaptive touch group. An increase ratio of the area of the adaptive touch group over the area of the corresponding touch group may be previously determined depending on at least one of a touch report rate and a maximum touch drawing speed.

The ID tracking part 54 sets comparison blocks, each including one or more adaptive touch groups contacting or overlapping each other. The ID tracking part 54 then matches temporary IDs of a current frame, which are given to touch points in each respective comparison block, to touch IDs of a previous frame using only the touch points in the same comparison block as comparison objects. The ID tracking part 54 performs one-to-one comparison between each of the touch points represented by the temporary IDs of the current frame and each of the touch points represented by the touch IDs of the previous frame within a given comparison block, and calculates a cost based on an angle and a distance between the temporary ID and the touch ID which are compared with each other. The ID tracking part 54 matches each respective temporary ID with the touch ID resulting in the minimum cost, among all the touch IDs in the comparison block, when compared with that temporary ID. The ID tracking part 54 may then connect touch coordinates of a given user, which may repeatedly change during a plurality of frame periods, to the same touch ID.

The output part 55 then transmits the touch coordinates, to which the touch ID is assigned, to the host system 18 as a digital data in HID format.

Figure 18:
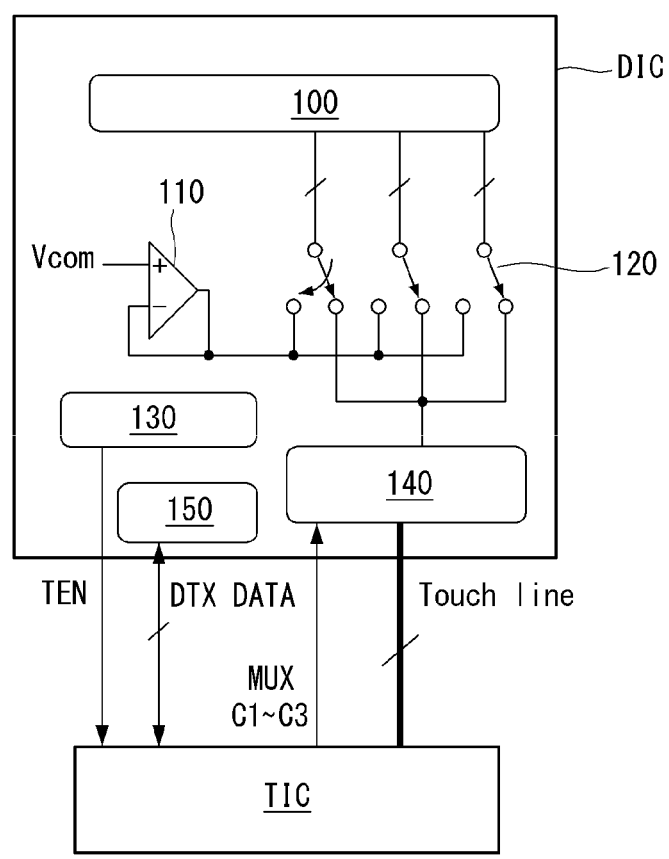
FIGS. 18 to 20 show various examples of a touch driving device according to an example embodiment of the invention.
Figure 19:
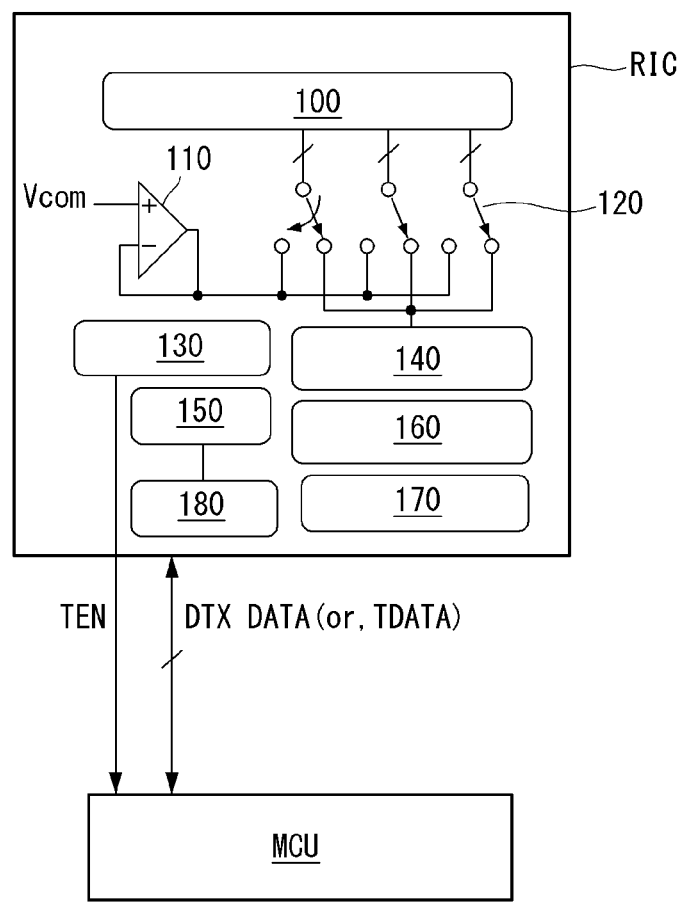
Figure 20:
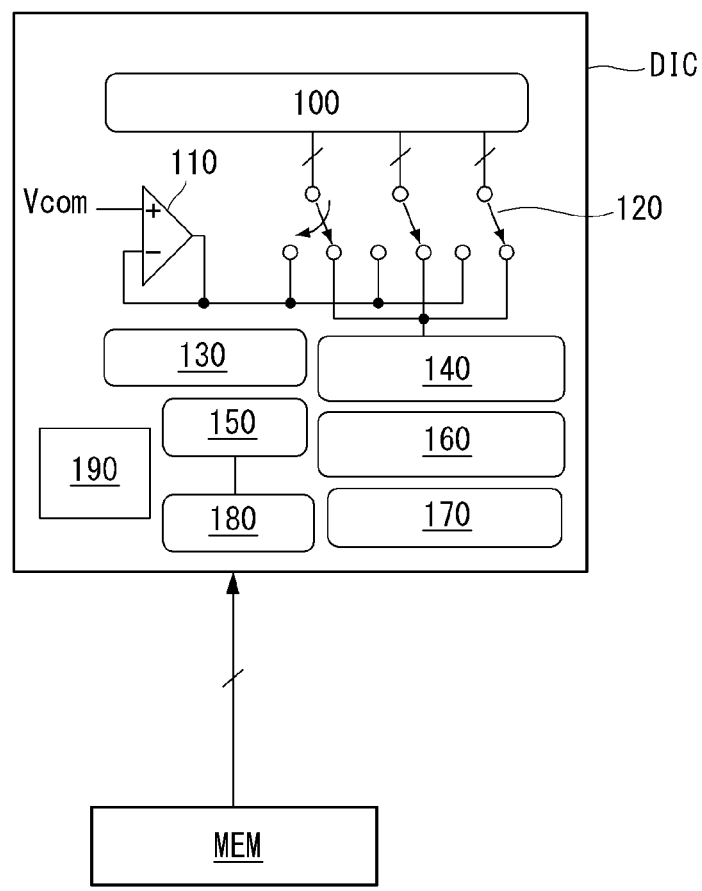

FIGS. 18 to 20 show various examples of the touch driving device 20 according to the example embodiments of the present invention. The touch driving device 20 according to the example embodiment of the present invention may be implemented as any of the example IC packages shown in FIGS. 18 to 20, respectively.

As shown in FIG. 18, the touch driving device 20 may includes a driver IC DIC and a touch sensing IC TIC. The driver IC DIC may include a touch sensor channel circuit 100, a Vcom buffer 110, a switch array 120, a timing control signal generator 130, a multiplexer (MUX) 140, and a DTX compensation circuit 150.

The touch sensor channel unit 100 is connected to electrodes of the touch sensors through the sensor lines, and is connected to the Vcom buffer 110 and the multiplexer 140 through the switch array 120. The multiplexer 140 connects the sensor lines to the touch sensing IC TIC. In case of a 1-to-3 multiplexer, for example, the multiplexer 140 may sequentially connect one channel of the touch sensing IC TIC to four of the sensor lines in a time-division manner, thereby reducing the number of channels of the touch sensing IC TIC. The multiplexer 140 may sequentially select the sensor lines, which will be connected to a given channel of the touch sensing IC TIC, in response to MUX control signals MUX C1 to MUX C3. The multiplexer 140 is connected to the channels of the touch sensing IC TIC through touch lines.

The Vcom buffer 110 outputs the common voltage Vcom of the pixel. The switch array 120 supplies the common voltage Vcom output from the Vcom buffer 110 to the touch sensor channel unit 100 during the display driving period under the control of the timing control signal generator 130. The switch array 120 connects the sensor lines to the touch sensing IC TIC through the multiplexer 140 during the touch sensor driving period under the control of the timing control signal generator 130.

Figure 13:
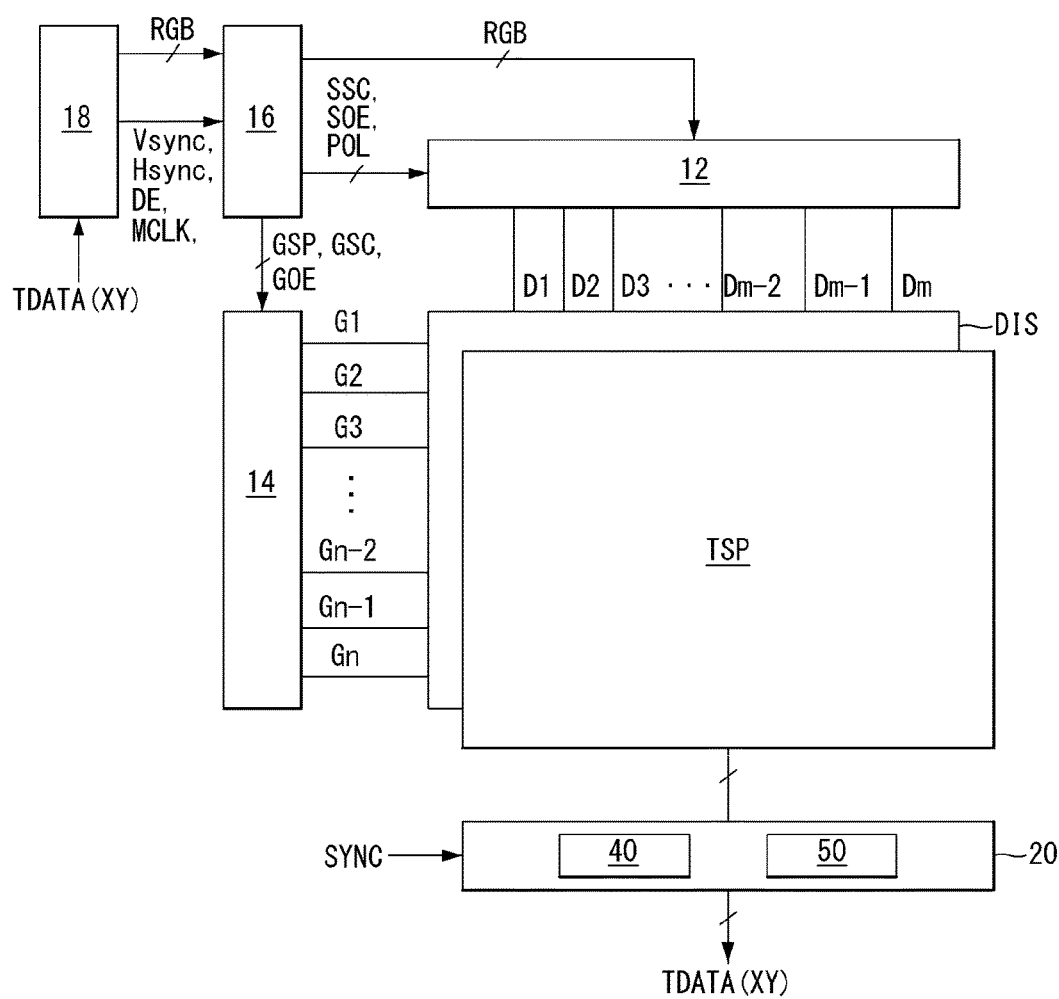
FIG. 13 shows a multi-touch sensitive display device according to an example embodiment of the invention.

The timing control signal generator 130 may generate timing control signals for controlling operation timings of the display driving circuit and the touch sensing IC TIC. As illustrated in FIG. 13, for example, the display driving circuit may include the data driving circuit 12 for applying data voltages representing an input image to the pixels and the scan driving circuit 14. The data driving circuit 12 may be integrated into the driver IC DIC. The scan driving circuit 14 may be disposed on a substrate of the display panel DIS along with the pixels.

The timing control signal generator 130 of the driver IC DIC may be substantially the same as a timing control signal generator present in the timing controller 16 shown in FIG. 13. The timing control signal generator 130 drives the display driving circuit during the display driving period and drives the touch sensing IC TIC during the touch sensor driving period.

The timing control signal generator 130 may produce a touch enable signal TEN defining the display driving period T1 and the touch sensor driving period T2 as shown, for example, in FIG. 16 and synchronize the display driving circuit with the touch sensing IC TIC. The display driving circuit may apply data voltages to the pixels, for example, during a period in which the touch enable signal TEN is at a first level. The touch sensing IC TIC may drive the touch sensors in response to the touch enable signal TEN being at a second level and sense the touch input. The first level of the touch enable signal TEN may be a high level voltage, and the second level a low level voltage, or vice versa.

The touch sensing IC TIC may be connected to a driving power unit (not shown) and receive driving power. The touch sensing IC TIC may produce and apply the touch sensor driving signal to the touch sensors in response to the touch enable signal TEN being at the second level. The touch sensor driving signal may be generated in various pulse shapes including a square wave, a sine wave, a triangle wave, and so on. However, it may be preferable, though not required, that the touch sensor driving signal is generated in a pulse shape of a square wave. The touch sensor driving signal may be applied to each of the touch sensors N times, so that charges are accumulated in an integrator incorporated in the touch sensing IC TIC N or more times, where N is a natural number greater than 1.

A noise in the touch sensor driving signal may increase depending on changes in the input image data. The DTX compensator 150 analyzes the input image data, removes a noise component from raw touch data depending on changes in the gray level of the input image data, and transmits the raw touch data to the touch sensing IC TIC. DTX means Display and Touch crosstalk. The details of the DTX compensator 150 is disclosed, for example, in Korean Patent Application No. 10-2012-0149028 filed on Dec. 19, 2012 by the present applicant, which is hereby incorporated by reference in its entirety. In case of a system in which the noise in the touch sensor does not sensitively change depending on changes in the input image data, the DTX compensator 150 may not be necessary and thus may be omitted. In the example shown in FIG. 18, "DTX DATA" is the output data of the DTX compensator 150.

The touch sensing IC TIC may drive the multiplexer 140 in response to the touch enable signal TEN from the timing control signal generator 130 during the touch sensor driving period T2 and receive the charges of the touch sensors through the multiplexer 140 and the sensor lines.

The touch sensing IC TIC may detect a change in the amount of charges in the touch sensor driving signal before and after the touch input, and compare the change amount with a predetermined threshold value. The touch sensing IC TIC may determine a location of the touch sensors having a change in the amount of charges equal to or greater than the threshold value as an area of the touch input. The touch sensing IC TIC may receive DTX DATA and calculate coordinates of each touch input and transmit touch data TDATA(XY) including the coordinate information of the touch input to the host system 18. The touch sensing IC TIC may include an amplifier to amplify charges of the touch sensor, an integrator to accumulate the charges received from the touch sensor, an analog-to-digital converter (ADC) to convert a voltage of the integrator into a digital data as a raw touch data, and an arithmetic logic unit. The arithmetic logic unit may compare the raw touch data output from the ADC with the threshold value and determine a touch input based on the result of the comparison. The arithmetic logic unit may perform a touch recognition algorithm to calculate coordinates of the touch input.

The driver IC DIC and the touch sensing IC TIC each may transmit and receive signals through a serial peripheral interface (SPI) or a bus low-voltage differential signaling (BLVDS) interface.

As illustrated in FIG. 19, the touch driving device 20 may include a readout IC MC and a microcontroller MCU. The readout IC RIC may include a touch sensor channel circuit 100, a Vcom buffer 110, a switch array 120, a first timing control signal generator 130, a multiplexer (MUX) 140, a DTX compensator 150, a sensing circuit 160, a second timing control signal generator 170, and a memory 180. The readout IC MC shown in FIG. 19 is different from the driver IC DIC shown in FIG. 18 in that the sensing circuit 160 and the second timing control signal generator 170 are additionally integrated into the readout IC MC. The first timing control signal generator 130 of FIG. 19 may be substantially the same as the timing control signal generator 130 of FIG. 18. Thus, the first timing control signal generator 130 may generate timing control signals for controlling operation timings of the display driving circuit and the readout IC MC.

The multiplexer 140 floats electrodes of the touch sensor accessed by the sensing circuit 160 under the control of the MCU. The touch sensor electrodes accessed by the sensing circuit 160 are selected by the sensing circuit 160 from a plurality of touch sensor electrodes except those touch sensor electrodes connected to the pixels charged to the data voltage. The multiplexer 140 may supply the common voltage Vcom under the control of the MCU.

The sensing circuit 160 is connected to the sensor lines through the multiplexer 140. The sensing circuit 160 may measure a change in a waveform of the voltage received from the touch sensors and convert the change into a digital data. The sensing unit 160 may include an amplifier to amplify the received voltages of the touch sensor electrodes (e.g., 31 in FIG. 15), an integrator to accumulate the amplified voltages of the amplifier, and an analog-to-digital converter (ADC) to convert the accumulated voltage of the integrator into a digital data. The digital data output from the ADC is the raw touch data TDATA, which may be transmitted to the MCU.

The second timing control signal generator 170 may generate timing control signals and clocks for controlling operation timings of the multiplexer 140 and the sensing circuit 160. The DTX compensator 150 in FIG. 19 is substantially the same as that shown in FIG. 18, and thus may be omitted in certain systems as discussed above. The memory 180 temporarily stores the raw touch data TDATA or the DTX DATA under the control of the second timing control signal generator 170.

The readout IC RIC and the microcontroller MCU may each transmit and receive signals through a serial peripheral interface (SPI) or a bus low-voltage differential signaling (BLVDS) interface. The MCU may compare the raw touch data TDATA (or the DTX TDATA if the DTX compensator 150 is employed) with a predetermined threshold value and determine a touch input based on the result of the comparison. The MCU may perform a touch recognition algorithm to calculate coordinates of the touch input and transmit touch data TDATA(XY) including the coordinate information of the touch input to the host system 18.

As shown in FIG. 20, the touch driving device 20 may include a driver IC DIC and a memory MEM. The driver IC DIC may include a touch sensor channel circuit 100, a Vcom buffer 110, a switch array 120, a first timing control signal generator 130, a multiplexer 140, a DTX compensator 150 (which may be omitted as discussed above), a sensing circuit 160, a second timing control signal generator 170, a memory 180, and a microcontroller MCU 190. The driver IC DIC shown in FIG. 20 is different from the readout IC RIC shown in FIG. 19 in that the MCU 190 is additionally integrated into the driver IC DIC. The MCU 190 may compare the raw touch data TDATA (or the DTX DATA if the DTX compensator 150 is employed) with a predetermined threshold value and determine a touch input based on the result of the comparison. The MCU 190 may perform a touch recognition algorithm to calculate coordinates of the touch input and transmit touch data TDATA(XY) including the coordinate information of the touch input to the host system 18.

The memory MEM may store a register setting value related to timing information required in operations of the display driving circuit and the sensing circuit 160. When the display device (e.g., as shown in FIG. 13) is powered on, the register setting value may be loaded from the memory MEM to the first timing control signal generator 130 and the second timing control signal generator 170. The first timing control signal generator 130 and the second timing control signal generator 170 may then generate timing control signals for controlling the display driving circuit and the sensing circuit 160 based on the register setting value read from the memory MEM. Accordingly, this example embodiment of the invention can respond to changes in a model of a display device without changing the structure of the driving devices (e.g., the DIC, the display driving circuit, or the touch driving circuit) by changing the register setting value of the memory MEM.

As described above, the example embodiments of the invention can increase the touch report rate and enhance the touch latency performance even with an increased number of touch points by reducing the process time for assigning the touch IDs in large area touch screens.

It will be apparent to those skilled in the art that various modifications and variations can be made in a multi-touch sensitive display device and a method for assigning a touch identification in the multi-touch sensitive display device of the present invention, and in the disclosed embodiments of the invention, without departing from the spirit or scope of the invention. Thus, it is intended that the present invention cover the modifications and variations of this invention provided they come within the scope of the appended claims and their equivalents.

What is claimed is:

1. A multi-touch sensitive display device, comprising:
a touch screen having a plurality of touch sensors; and
a touch driving device configured to apply a touch driving signal to the touch sensors and to sense one or more touch points, the touch driving device including:
a touch sensing circuit configured to sense a change in capacitance of one or more of the touch sensors and to generate raw touch data based on the change in capacitance; and
a touch analyzer configured to detect a plurality of touch points based on the raw touch data and to respectively assign temporary identifications (IDs) to the touch points, to group the touch points based on a difference in distances between the touch points to form a plurality of touch groups, to form a plurality of adaptive touch groups respectively based on the touch groups, to set a comparison block including one or more of the adaptive touch groups contacting or overlapping each other, and to match the temporary ID assigned to one of the touch points within the comparison block in the current frame to one of a plurality of touch IDs within the comparison block in a previous frame by comparing the one touch point in the current frame only to touch points represented by the touch IDs of the previous frame within the comparison block,
wherein the touch driving device includes:
a touch sensor channel circuit connected to the touch sensors respectively through a plurality of sensor lines in the touch screen;
a common voltage buffer configured to provide a common voltage to the sensor lines through the touch sensor channel circuit during a display driving period;
a multiplexer connected to the touch sensing circuit and configured to connect the touch sensing circuit to the sensor lines though the touch sensor channel circuit during a touch driving period;
a switch array configured to connect the sensor lines through the touch sensor channel circuit to the common voltage buffer during the display driving period and to the multiplexer during the touch driving period; and
a timing control signal generator configured to generate a touch enable signal defining the display driving period and the touch driving period.

2. The multi-touch sensitive display device of claim 1, wherein the touch analyzer is further configured to connect coordinates of the one touch point in the current frame to the matched one of the touch IDs, and to transmit the coordinates and the matched touch ID to a host system.

3. The multi-touch sensitive display device of claim 1, wherein an area of one of the adaptive touch groups is greater than an area of the corresponding one of the touch groups having the same touch points as the one adaptive touch group, and
wherein an increase ratio of the area of the one adaptive touch group over the area of the corresponding one touch group is determined based on at least one of a touch report rate and a maximum touch drawing speed.

4. The multi-touch sensitive display device of claim 1, wherein the touch analyzer is configured to detect the touch points by processing the touch raw data based on a predetermined critical value, extracting touch areas, and detecting the touch points based on a center of mass of each of the touch areas.

5. The multi-touch sensitive display device of claim 1, wherein the touch analyzer is configured to group the touch points by setting a plurality of group division lines, each surrounding a respective one of the touch groups, and
wherein the touch analyzer is configured to form the adaptive touch groups by extending the group division lines by a predetermined ratio to form the respective adaptive touch groups.

6. The multi-touch sensitive display device of claim 5, wherein each of the group division lines has a quadrilateral shape connecting outermost edges of the touch points in a corresponding one of the touch groups.

7. The multi-touch sensitive display device of claim 1, wherein the touch analyzer is configured to group the touch points by setting a group guide line surrounding at least one of the touch points, determining whether or not the group guide line overlaps another one of the touch point, and if the group guide line overlaps another one of the touch points, extending the group guide line at a predetermined ratio until the group guide line overlaps no other touch point, and setting the touch points surrounded by the group guide line as forming one of the touch groups.

8. The multi-touch sensitive display device of claim 1, wherein the touch analyzer is configured to match the temporary ID by performing a one-to-one comparison between each of the touch points of the current frame in the comparison block and represented by the temporary IDs, and each of the touch points of the previous frame in the comparison block and represented by the touch IDs by calculating a cost by adding an angle and a distance between each of the touch points represented by the temporary IDs and each of the touch points represented by the touch Ds, and matching one of the temporary IDs to one of the touch IDs resulting in the smallest cost, among the touch IDs in the comparison block, when compared with the one temporary ID.

9. The multi-touch sensitive display device of claim 1, wherein the touch driving device includes a driver integrated circuit (IC) and a touch sensing integrated circuit (IC),
wherein the driver IC includes the touch sensor channel circuit, the common voltage buffer, the multiplexer, the switch array, and the timing control signal generator, and
wherein the touch sensing IC includes the touch sensing circuit and the touch analyzer.

10. The multi-touch sensitive display device of claim 1, wherein the touch driving device includes a readout IC having the touch sensing circuit and a microcontroller having the touch analyzer, and
wherein the readout IC further includes the touch sensor channel circuit, the common voltage buffer, the multiplexer, the switch array, and the timing control signal generator, and
wherein the timing control signal generator includes:
a first timing control signal generator configured to generate the touch enable signal defining the display driving period and the touch driving period; and
a second timing control signal generator configured to control operation timings of the multiplexer and the touch sensing circuit.

11. The multi-touch sensitive display device of claim 1, wherein the touch driving device includes a driver IC and a memory,
wherein the driver IC includes the touch sensing circuit and the touch analyzer; and further includes the touch sensor channel circuit, the common voltage buffer, the multiplexer, the switch array, and the timing control signal generator,
wherein the timing control signal generator includes:
a first timing control signal generator configured to generate the touch enable signal defining the display driving period and the touch driving period; and
a second timing control signal generator configured to control operation timings of the multiplexer and the touch sensing circuit, and
wherein the memory stores a register setting value related to timing information to be loaded to at least one of the first timing controller and the second timing controller.

* * * * *